Aug. 16, 1966     H. G. STENGER     3,267,194
METHOD AND APPARATUS FOR FEEDING PLASTIC MATERIAL
Filed Jan. 16, 1964     3 Sheets-Sheet 1
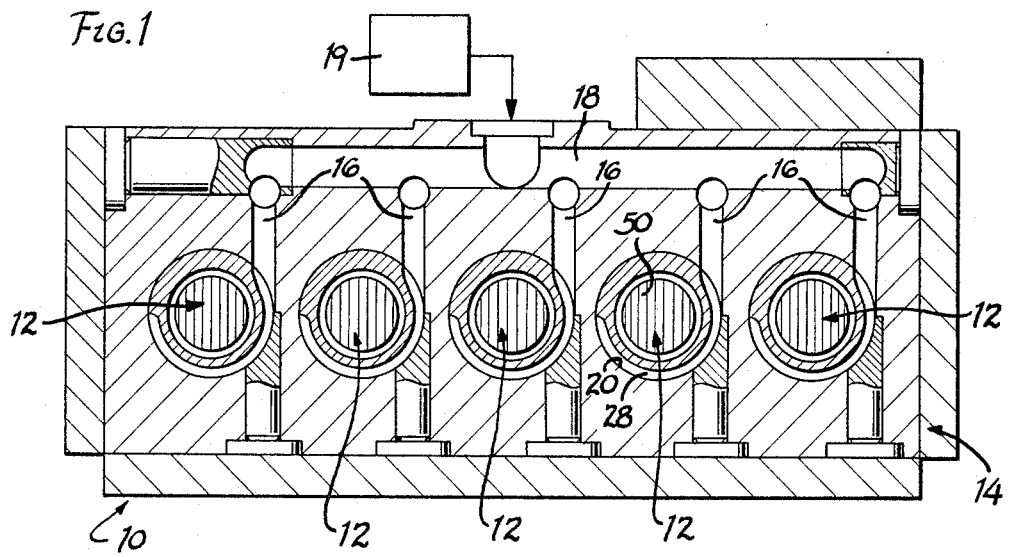
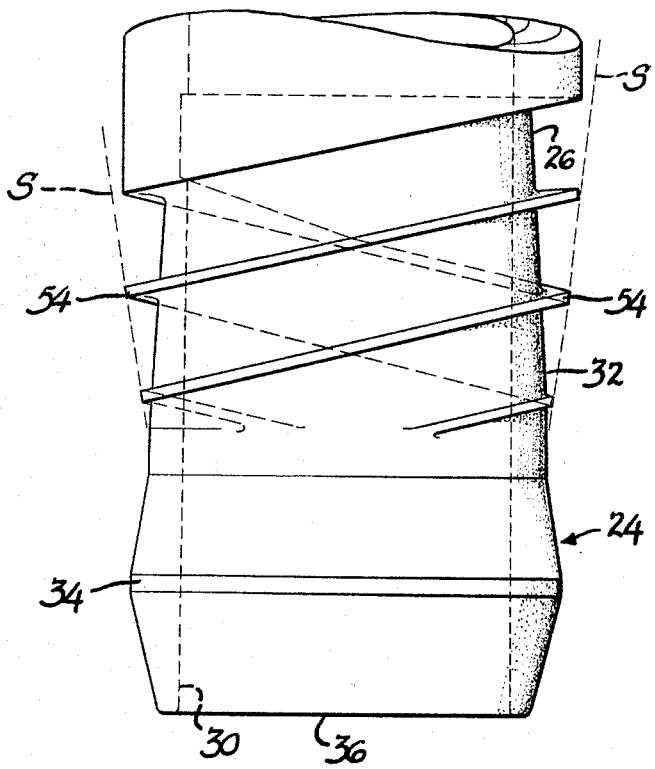
INVENTOR.
HANS G. STENGER
BY
ATTORNEYS

INVENTOR.
HANS G. STENGER

United States Patent Office 3,267,194
Patented August 16, 1966

3,267,194
METHOD AND APPARATUS FOR FEEDING
PLASTIC MATERIAL
Hans G. Stenger, Lambertville, Mich., assignor to Owens-Illinois Inc., a corporation of Ohio
Filed Jan. 16, 1964, Ser. No. 338,036
7 Claims. (Cl. 264—329)

This invention relates to methods and apparatus for feeding plastic material to an extrusion orifice of a plastic forming machine, and more particularly to methods and apparatus for imparting a mixing action to plastic material during its flow between a plasticizing means and an extrusion orifice.

In plastic forming machines of the type with which the present invention is concerned, the raw material is initially plasticized, as by a screw extruder, and conducted from the plasticizing mechanism to an annular orifice from which the plasticized material is extruded. During the flow of the material from the extruder to the orifice, it is necessary, especially where pigmented materials are used, to subject the material to a mixing action so that the material, as it issues from the orifice, is of uniform and homogenous consistency and color, free from lines and/or spots.

Accordingly, it is an object of the present invention to provide a new and improved method of and apparatus for imparting a thorough mixing action to plastic material as the material is flowed toward an orifice.

It is an ancillary object of the invention to provide a method and apparatus which will reduce the time required to effect a color change in the material being supplied to an orifice of a plastic forming machine.

Still another object of the invention is to provide method and apparatus by means of which an improved uniform mixing of plastic material is achieved while maintaining a smooth and uninterrupted flow of plastic material toward an extrusion orifice.

Still another object of the invention is to provide an injection head for a plastic forming machine which does not require the dividing of the flow of material within the injection head.

The foregoing, and other objects, are achieved in an injection head wherein plasticized material under pressure is supplied in a tangential direction to one end of an annular flow passage within the head. Within the flow passage, the radially inner wall of the passage is defined by a frusto-conical or tapered inner wall which increases in diameter in the axial direction away from the point of tangential entry of the material into the annular passage. The outer wall of the passage, in the usual case, is of constant diameter so that the cross sectional area of flow within the annular passage decreases. Projecting from the inner wall of the annular passage is a spiral or helical flight which initially extends entirely radially across the annular passage and gradually reduces in external diameter to provide an increasing space between the outer edge of the spiral flight and the outer wall of the annular passage. Material flowed into the annular passage under pressure is confined and guided by the spiral flight into a generally helical path, and as the outer diameter of the spiral flight steadily decreases, an increasing proportion of the material flowing through the annular passage can spill or cascade over the outer edges of the flight, thus imparting a greatly increased mixing and homogenizing action to the material during its passage through the annular passage.

Other objects and features of the invention will become apparent by reference to the following specification and to the drawings.

In the drawings:

FIG. 1 is a cross sectional view taken on a horizonal plane through a multiple orifice injection head embodying one form of the present invention;

FIG. 3 is a detail side elevational view of the lower portion of the spiral sleeve of FIG. 2;

Figure 2:
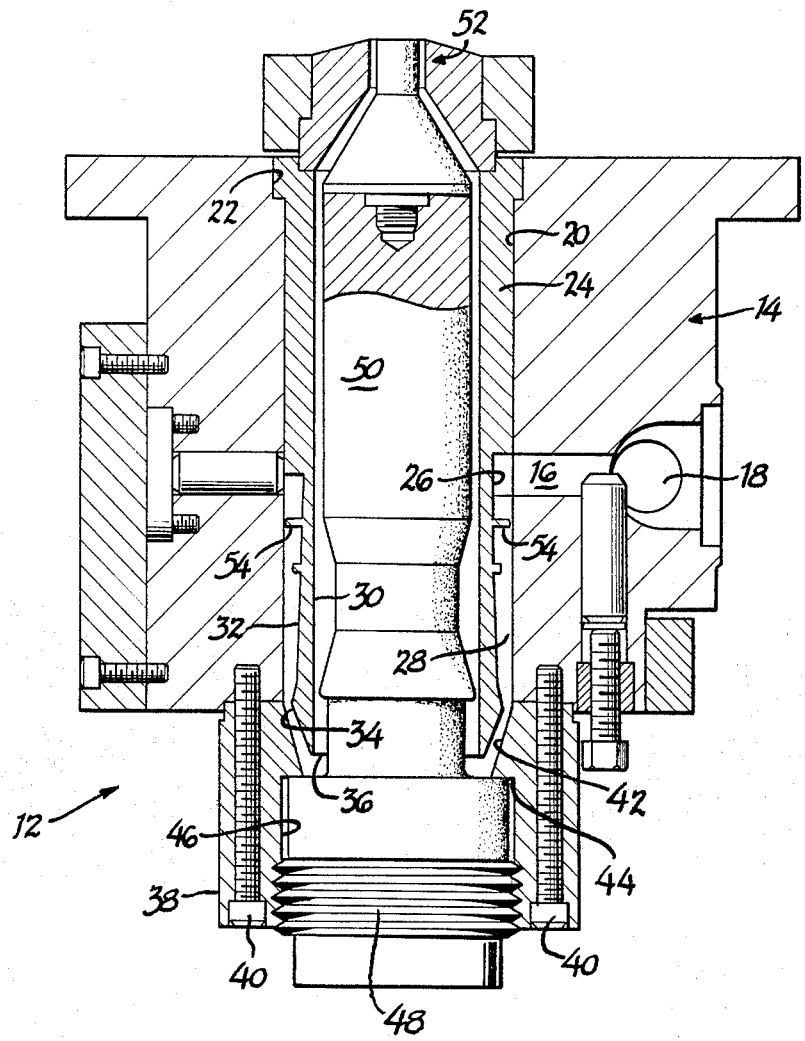
FIG. 2 is a vertical cross sectional view through one of the orifice assemblies of the head of FIG. 1.

Both forms of the invention disclosed in the drawings are adapted for use with a plastic forming machine such as that disclosed in my United States Patent No. 3,090,994 assigned to the assignee of the present application. In order to more particularly point out the invention, details of the plastic forming machine are omitted from the present application, and reference to Patent Number 3,090,994 may be had for details of the elements of the plastic forming machine not shown or described herein.

Referring first to the embodiment of FIGS. 1 through 3, there is shown in FIG. 1 in cross section a multiple orifice injection head designated generally 10 in which a plurality of like individual injection heads 12 are mounted within a common head block or frame designated generally 14. Each of the individual heads 12 communicates by means of an inlet passage 16 in manifold fashion to a main supply passage 18 formed in block 14, passage 18 being adapted to receive a controlled flow of molten plasticized material under pressure from a plastic material supply source designated schematically at 19 in FIG. 1. Details of the structure, operation and control of plastic supply means 19 may be found in the aforementioned Patent Number 3,090,994.

Since each of the individual heads 12 is identical, the view of FIGS. 2 and 3 are equally applicable to all of the five individual heads shown in FIG. 1. Referring now to FIG. 2, a bore 20 is formed in block 14 with a relatively short enlarged diameter section 22 at its upper end to form a shoulder for positioning a sleeve 24 concentrically within bore 20. As best seen in FIG. 2, the upper portion of sleeve 24 snugly fits within bore 20 and enlarged diameter section 22, while the lower portion of the sleeve is relieved as at 26 to define an annular passage 28 between the outer surface of sleeve 24 and the wall of bore 20.

Sleeve 24 is hollow with a concentric internal passage 30 of constant diameter passing entirely through the length of the sleeve. At the lower or relieved portion 26, the outer surface of sleeve 24 is tapered outwardly and downwardly as at 32, so that annular passageway 28 becomes progressively narrower toward its bottom. In approximate alignment with the bottom of block 14, the outer surface of sleeve 24 is flared outwardly to a maximum diameter section at 34, the lower end of the outer surface of the sleeve being tapered inwardly from maximum diameter portion 34 to the lower end 36 of the sleeve.

The lower end of the sleeve projects downwardly beyond the lower surface of block 14, and a second block 38 is fixedly secured as by bolts 40 to the lower surface of the main block 14. At its upper portion, block 38 is formed with a downwardly and inwardly convergent bore 42 which terminates at a downwardly facing shoulder 44 defining the upper end of an enlarged diameter bore 46. Bore 46 is tapped at its lower end to threadably receive a hub portion 48 of a mandrel member 50 which projects concentrically upwardly into and substantially through the central passage 30 in sleeve 24.

Hub portion 48 of mandrel 50 is spaced below the lower end 36 of sleeve 24 so that annular passage 28 communicates with central passage 30 of the sleeve at the lower end 36 of the sleeve. The diameter of mandrel 50 is less than the internal diameter of passage 30, thus defining a second annular passage which extends upwardly through the interior of sleeve 24, the passage defined between mandrel 50 and the interior of sleeve 24 communicating at its upper end with an orifice 52 which may communicate, as more fully disclosed in Patent Number 3,090,994, with a neck mold.

As best seen in FIG. 2, the relieved portion 26 on the outer surface of sleeve 24 extends downwardly from the location at which inlet passage 16 communicates with bore 20. In addition to the downwardly divergent taper 32 on the outer surface of the relieved portion of the sleeve, a pair of helical flights 54 projects outwardly from sleeve 24 into annular passage 28. As best seen in FIG. 2, the outer diameter of the flights 54 is substantially equal to the internal diameter of bore 20 near the upper end of relieved section 26, but decreases in the downward extent of the flights so that the outer edge of flights 54 would lie on a downwardly convergent frusto-conical surface. Such a surface is indicated in broken line at S in FIG. 3, the degree of the taper being somewhat exaggerated in the drawings for purposes of illustration. In actual practice, a taper in the order of 10 degrees has been found to yield good results.

The purpose of helical flights 54 and the taper applied to the flights and to relieved portion 26 may best be appreciated in terms of the operation of the structure described above. In operation, plasticized material is fed under pressure into inlet passage 16 and thence tangentially into annular passage 28. The tangential entry of the material into passage 28 is most clearly seen from an examination of FIG. 1. Because sleeve 24 is held stationary within block 14, the downwardly spiraling flights 54 initially confine and guide all of the material entering passage 28 into a helical flow path. However, as the material proceeds to spiral downwardly around the outer surface of sleeve 28, the continually reducing outer diameter of flights 54 permits a greater proportion of the material to spill over the outer edge of the flights and to cascade downwardly across the flight edges. The cascading action is abetted by the continuous reduction in the cross sectional area of flow provided by the downwardly divergent tapered surface of relieved portion 26.

Thus, as the material passes downwardly through annular passage 28, a continually increasing proportion of the material diverges from the helical path established by flights 54 toward a more axially directed path. The cascading of the material over the edges of the flights imparts a substantially increased mixing action to the plastic material as it passes downwardly along the outer side of sleeve 24. Flights 54 are terminated somewhat short of the maximum diameter portion 34 of the sleeve which defines a restriction near the lower end of annular passage 28. The material flows past the restriction and then passes upwardly through the interior of sleeve 24 to its point of use.

Figure 4:
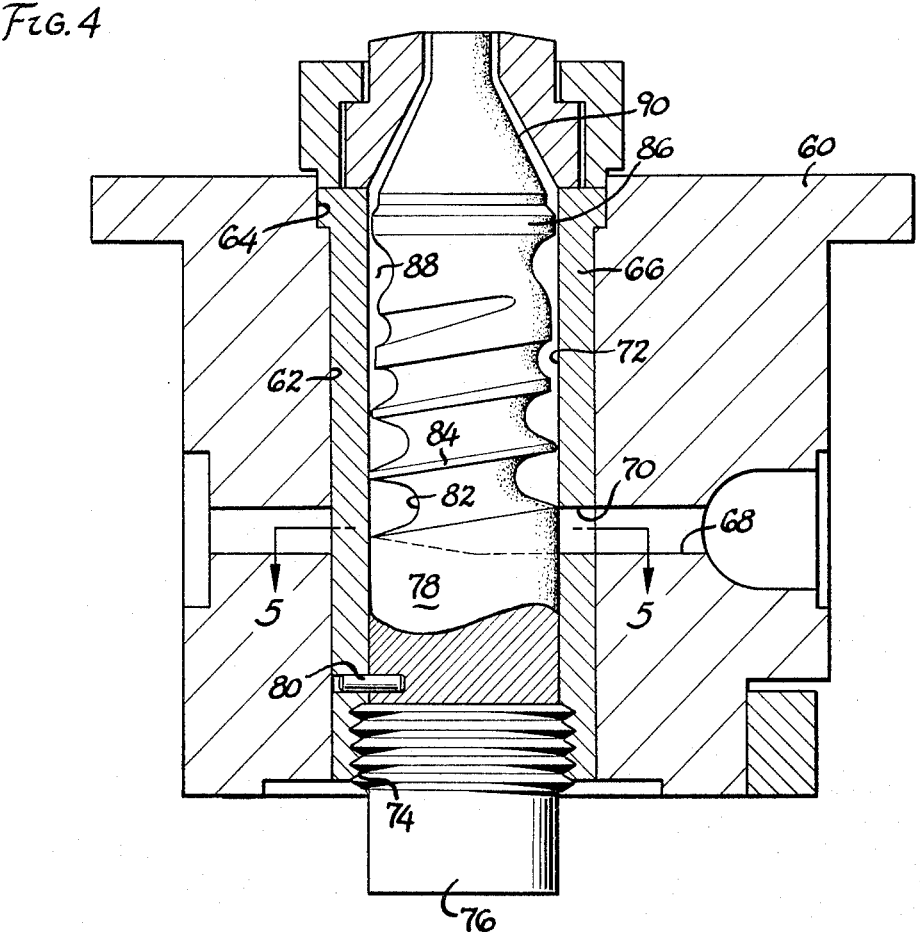
FIG. 4 is a vertical cross sectional view similar to FIG. 2 showing another form of the present invention.
Figure 5:
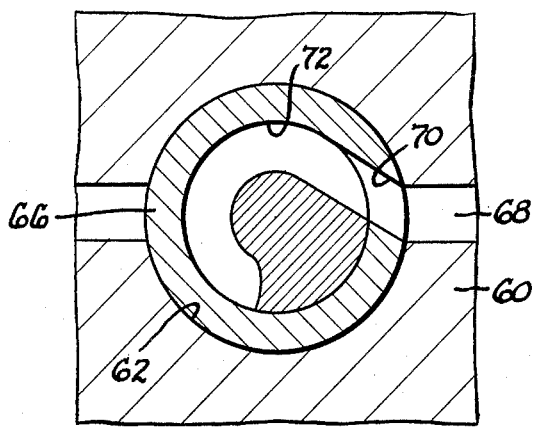
FIG. 5 is a detail horizontal cross sectional view taken on line 5—5 of FIG. 4.

A modified form of the invention is disclosed in FIGS. 4 and 5. In the embodiment of FIGS. 4 and 5, a main block designated generally 60 is formed with a bore 62 of constant diameter, having an enlarged diameter section 64 at its upper end to provide a shoulder for retaining a hollow cylindrical sleeve 66 in position within the block. The block is also provided with a horizontal inlet passage 68 which, in this embodiment, extends radially of the axis of bore 62 (see FIG. 5). An inlet bore 70 passes through the wall of sleeve 66 from passage 68 into tangential alignment with the inner wall 72 of sleeve 66. The internal diameter of sleeve 66 is constant with the exception of a tapped portion 74 at its lower end which is formed to threadably receive an external thread 76 on the lower end of a mandrel designated generally 78. A pin 80 is employed to couple mandrel 78 to sleeve 66 to prevent relative rotation between the sleeve and mandrel, sleeve 66 in turn being locked by means not shown against rotation within block 60.

Below the intersection of inlet passage 68, 70 with mandrel 78, the mandrel completely fills the interior of sleeve 66. Beginning at the level of the inlet passage 68, 70, the outer surface of the mandrel is formed with a helical groove 82 which has a maximum depth or minimum outer diameter adjacent inlet passage 70 and tapers upwardly and outwardly as best seen in FIG. 4. The helical groove forms a continuous flight 84 which, as in the case of the flights 54 of the previously described embodiment, is of continuously reducing diameter in its upward extent. Near the upper end of sleeve 66, mandrel 78 is flared outwardly to a maximum diameter portion 86 which defines a restriction in the annular passage 88 between the outer surface of the mandrel and the inner wall of sleeve 72. Beyond restriction 86, annular passage 88 communicates with an outlet section 90 which in turn communicates with an orifice or neck mold, not shown, but see Patent Number 3,090,994.

The operation of the embodiment of FIGS. 4 and 5 is similar to that of the embodiments of FIGS. 1 through 3, with the exception that there is no axial reversal of flow of the material through the head. Plasticized material under pressure is fed into inlet passage 68 and passes through passage 70 tangentially into annular passage 88 at the interior of the sleeve. Groove 82 confines and guides the entering material into an upwardly spiraling flow, the tapered outer diameter of flights 84 permitting an increasing proportion of the upwardly flowing material to spill or cascade over the flights to promote a thorough mixing of the material during its passage through the head.

As in the previously described embodiment, the cascading of the material over the flights is further assisted by the continuously reducing cross sectional area of the grooves 82, the upwardly divergent taper on the "shank" of mandrel 78 cooperating with the upwardly convergent taper of the outer surface of the flights 84. A precisely similar arrangement was employed in the embodiment of FIGS. 1 through 3 with the downwardly divergent taper 32 cooperating with the downwardly convergent taper of flights 54.

The improved mixing action achieved in the above manner provides a greatly improved and more uniform mixing of the plastic material during its passage through the heads. This advantage in turn provides a further advantage in that the time required to perform a complete color change in the plastic material is greatly reduced. By feeding the material tangentially into the annular passage, a smooth and uninterrupted flow of plastic material into and through the head is achieved. Both described embodiments do not require the splitting of the material into two separate flows at the sleeve with the consequent disadvantage of color variations and flow lines in the issuing material.

While two embodiments of the invention have been disclosed, it will be apparent to those skilled in the art that the disclosed embodiments may be modified. Therefore, the foregoing description is to be considered exemplary rather than limiting, and the true scope of the invention is that defined in the following claims.

I claim:

1. In a method of supplying plastic material to an extrusion orifice, the steps of directing a supply stream of material tangentially into one end of an axially elongated annular passage having a restricted annular outlet at its opposite end, confining and guiding the material entering the passage into a helical flow path along said passage toward said outlet, and gradually reducing the confinement of the material to said helical path to divert an increasing proportion of material from said helical path toward an axial path as the material approaches said outlet.

2. In a method of supplying plastic material to an extrusion orifice, the steps of directing a supply stream of material tangentially into one end of an axially elongated annular passage having a restricted annular outlet at its opposite end, confining and guiding the material entering the passage into a helical flow path along said passage toward said outlet, gradually reducing the confinement of the material to said helical path to divert an increasing proportion of material from said helical path toward an axial path as the material approaches said outlet, and reducing the cross sectional area of the passage concurrently with the reduction in confinement.

3. An injection head for a plastic forming machine comprising means defining an axially elongate annular passage having a restricted annular outlet at one end, means defining an inlet passage tangentially intersecting said annular passage at its opposite end, means for flowing plastic material through said inlet passage into said annular passage, and stationary guide means having a helical flight projecting radially across said annular passage for guiding material into a helical path through said annular passage toward said outlet, the radial extent of said flight across said annular passage decreasing from a maximum radial extent adjacent said inlet passage to a minimum radial extent at a location intermediate said inlet passage and said outlet.

4. An injection head for a plastic forming machine comprising means defining an axially elongate flow passage of constant diameter having a restricted annular outlet at one end, means defining an inlet passage tangentially intersecting said flow passage at its opposite end, means for flowing plastic material through said inlet passage into said flow passage, and a stationary spiral mandrel fixedly mounted concentrically within said flow passage and having a helical flight projecting radially across said flow passage for guiding material into a helical path through said flow passage toward said outlet, said mandrel being tapered toward said outlet with the radial extent of said flight across said flow passage decreasing from a maximum radial extent adjacent said inlet passage to a minimum radial extent at a location intermediate said inlet passage and said outlet.

5. An injection head for a plastic forming machine comprising means defining an axially elongate flow passage of constant diameter having a restricted annnular outlet at one end, means defining an inlet passage tangentially intersecting said flow passage at its opposite end, means for flowing plastic material through said inlet passage into said annular passage, a stationary mandrel fixedly mounted concentrically within said flow passage, said mandrel having a tapered shank having its small diameter end located adjacent said inlet passage and a helical flight projecting radially from said shank for guiding material into a helical path through said flow passage toward said outlet, the outer diameter of said flight decreasing from a maximum adjacent said inlet passage to a minimum at a location intermediate said inlet passage and said outlet to permit material to cascade over said flights during transit of said passage.

6. An injection head for a plastic forming machine comprising a block having a bore therein, a hollow sleeve concentrically mounted within said bore defining an axially elongate annular passage between the wall of the bore and the sleeve, said sleeve terminating at one end short of the one end of the bore to place said annular passage in communication with the interior of the sleeve, an inlet passage tangentially intersecting said annular passage at its opposite end, means for flowing plastic material through said inlet passage into said annular passage, and a helical flight on the outer side of said sleeve projecting radially from the sleeve into said annular passage for guiding material into a helical path through said annular passage toward said one end of said bore, the radial extent of said flight into said annular passage decreasing from a maximum adjacent said inlet passage to a minimum at a location intermediate said inlet passage and said one end of said sleeve.

7. An injection head as defined in claim 6 wherein said sleeve tapers from a minimum outer diameter adjacent said inlet passage to a maximum outer diameter adjacent said one end of said sleeve, the maximum diameter portion of said sleeve defining a restriction in said annular passage.

References Cited by the Examiner

UNITED STATES PATENTS

| 2,790,203 | 4/1957 | Dykehouse. | |
| 2,892,214 | 6/1959 | McCarthy | 263—328 |
| 3,045,283 | 7/1962 | Keiser. | |
| 3,090,994 | 5/1963 | Stenger | 264—328 |
| 3,110,932 | 11/1963 | Fischer. | |
| 3,118,184 | 1/1964 | Swenson. | |
| 3,156,013 | 11/1964 | Elphee. | |
| 3,175,248 | 3/1965 | Swenson. | |

ROBERT F. WHITE, *Primary Examiner.*

R. B. MOFFITT, *Assistant Examiner.*